US006981779B2

(12) United States Patent
Fukuoka

(10) Patent No.: US 6,981,779 B2
(45) Date of Patent: Jan. 3, 2006

(54) POWER TOOLS

(75) Inventor: Toru Fukuoka, Anjo (JP)

(73) Assignee: Makita Corporation, Anjo (JP)

( * ) Notice: Subject to any disclaimer, the term of this patent is extended or adjusted under 35 U.S.C. 154(b) by 64 days.

(21) Appl. No.: 10/700,759

(22) Filed: Nov. 3, 2003

(65) Prior Publication Data

US 2004/0093743 A1      May 20, 2004

(30) Foreign Application Priority Data

Nov. 1, 2002 (JP) .............................. 2002-320246

(51) Int. Cl.
  *B25B 23/18* (2006.01)
(52) U.S. Cl. ............................ 362/119; 13/123; 13/388
(58) Field of Classification Search ................ 362/119; 13/123, 124, 388, 390, 391; 83/13, 19, 520–522, 83/98, 171, 471.3, 477.1
  See application file for complete search history.

(56) References Cited

U.S. PATENT DOCUMENTS 3,535,829 A    10/1970 Dudek
3,873,862 A    3/1975 Butler
5,634,274 A    6/1997 Ohkouchi et al.
2001/0029819 A1 * 10/2001 Okouchi ........................ 83/13

FOREIGN PATENT DOCUMENTS

JP   8-336803      12/1996
JP   2003011101    1/2003

* cited by examiner

*Primary Examiner*—Sandra O'Shea
*Assistant Examiner*—Mark Tsidulko
(74) *Attorney, Agent, or Firm*—Lahive & Cockfield, LLP; Anthony A. Laurentano, Esq.

(57) ABSTRACT

It is an object of the present invention to provide a technique for making the effective use of cooling air for a motor within a power tool in order to rationalize the structure of the power tool. The representative power tool may have a tool bit case, a tool bit, a drive motor and a cooling air guiding member. The tool bit is provided within the tool bit case and performs a predetermined operation on a workpiece. The drive motor drives the tool bit. The cooling air guiding member guides cooling air for cooling the drive motor to a work area of the workpiece to be worked on with the tool bit, when the cooling air is discharged into the tool bit case. By such construction, the representative power tool can have rationalized structure that cooling air for cooling the drive motor of the power tool can also be utilized to clean the work area of the power tool.

11 Claims, 4 Drawing Sheets

POWER TOOLS

BACKGROUND OF THE INVENTION

1. Field of the Invention

The present invention relates to a power tool and more particularly, to a technique for effectively utilizing cooling air of a drive motor within a power tool.

2. Description of the Related Art

Japanese non-examined and laid-open patent publication No. 8-336803 discloses a technique of cooling the drive motor for driving a tool bit within a power tool. According to this technique, cooling air is introduced into a motor housing by rotating a fan blade so as to cool the drive motor. Then, the cooling air is led into the blade case through a partition structure that defines a cooling air passage between the motor housing and the blade case. According to this technique, the partition structure is designed and configured to improve the motor cooling efficiency.

Above-described prior art relates to a technique for improving the motor cooling efficiency or the fan performance utilizing a fan blade. On the other hand, further improvement is desired to rationalize the entire structure of a power tool.

SUMMARY OF THE INVENTION

It is, accordingly, an object of the present invention to provide a technique for making the effective use of cooling air for a motor within a power tool in order to rationalize the structure of the power tool.

According to one aspect of the present invention, representative power tool may comprise a tool bit case, a tool bit, a drive motor and a cooling air guiding member. The tool bit is provided within the tool bit case and performs a predetermined operation on a workpiece. The drive motor drives the tool bit. The cooling air guiding member guides cooling air for cooling the drive motor to a work area of the workpiece to be worked on with the tool bit, when the cooling air is discharged into the tool bit case. By such construction, the representative power tool can have rationalized structure such that cooling air for cooling the drive motor of the power tool can also be utilized to clean the work area of the power tool.

Other objects, features and advantages of the present invention will be readily understood after reading the following detailed description together with the accompanying drawings and the claims.

DEATAILED DESCRIPTION OF THE INVENTION

Figure 1:
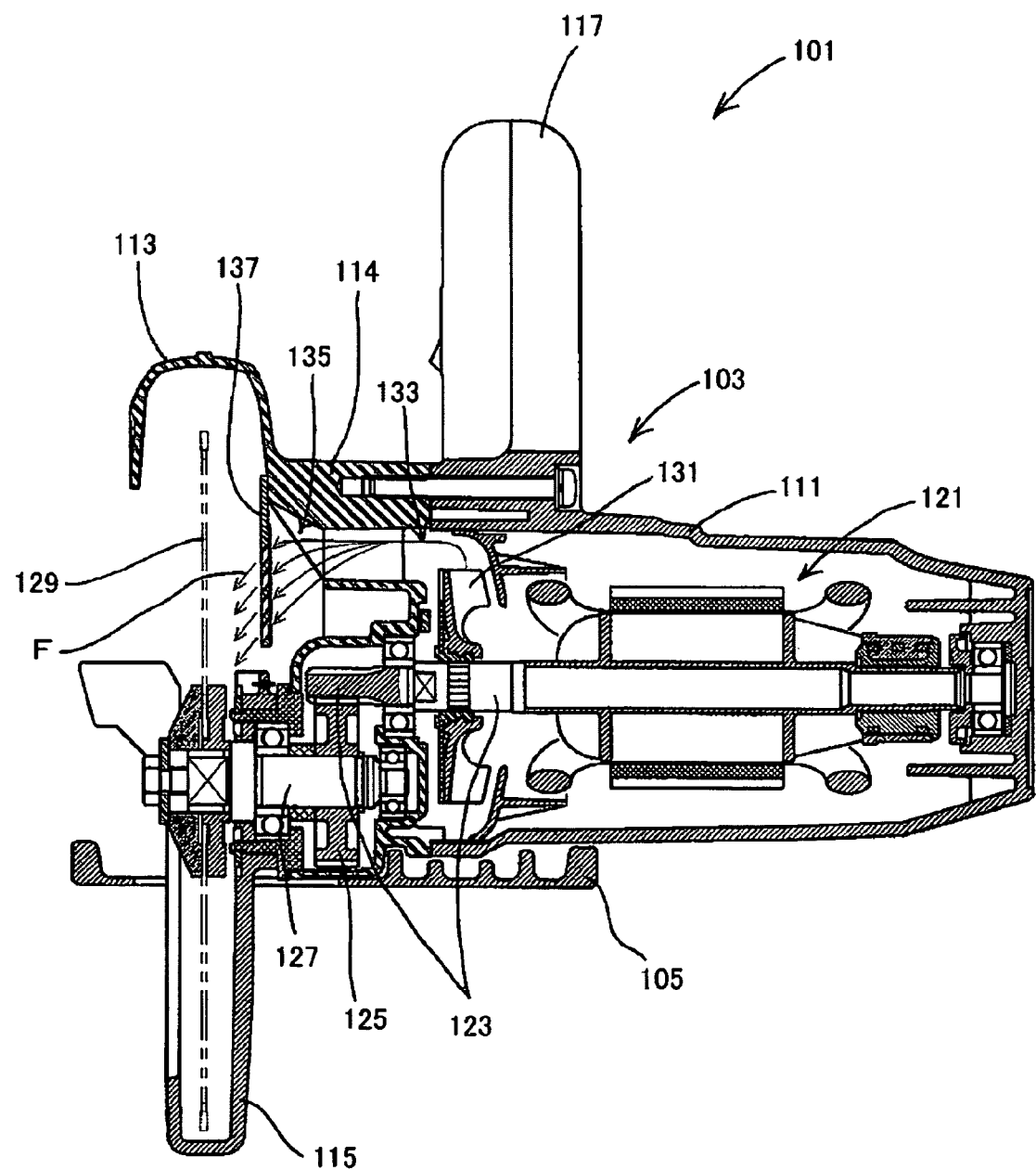
FIG. 1 shows a sectional front view of a circular saw according to a representative embodiment of the invention.

A representative power tool may include a tool bit that is housed in a tool bit case, a drive motor and a cooling air guiding member. The tool bit performs a predetermined operation on a workpiece. The "tool bit that performs a predetermined operation on a workpiece" may embrace various tool bits, such as rotary tool bits and reciprocating tool bits. Typically, the tool bit may comprise a circular saw or other similar power tool in which any obstacles such as cutting-chips are continuously generated during the operation onto the workpiece. The drive motor drives the tool bit. The drive motor generates heat when driving the tool bit. Therefore, cooling air is supplied to cool the drive motor.

The cooling air guiding member according to the present teachings may guide cooling air to a work area of the workpiece to be worked on with the tool bit, when the cooling air for cooling the drive motor is discharged into the tool bit case. Therefore, cooling air that has been introduced into the power tool in order to cool the drive motor is further led to the work area of the tool bit as being discharged into the tool bit case. As a result, cutting chips and any other obstacles produced during the operation of the power tool can be blown away from the work area, thereby ensuring the visibility of the work area on and around the workpiece, where ink lines or other marks are provided on the workpiece. In other words, cooling air for cooling the drive motor, which has been led into the power tool, can also serve to clean the work area of the power tool. Thus, the power tool can have rationalized structure. Further, according to the present teachings, quietness of the power tool can be improved owing to the structure in which cooling air is guided to the work area as being discharged into the blade case.

In accordance with the teachings of the invention, the term of "guiding the cooling air" may typically embrace the situation that the flowing direction of the cooling air may be changed so as to be led to the work area. For example, the flowing direction of the cooling air can be smoothly changed by discharging the cooling air to the tool bit through openings. Otherwise, part of the cooling air that has been discharged to the tool bit may be forcibly directed toward the tool bit via an air flow direction change plate or the like that is disposed transversely with respect to the flow of the cooling air.

The present invention may be preferably applied particularly to a circular saw that is utilized to cut a workpiece with a rotating blade. That is because chips or other obstacles may tend to stay in the work area during the operation of the circular saw. In such case, the cooling air guiding member may preferably guide the cooling air in a direction transverse to the cutting direction in which the workpiece is cut by the rotating blade.

Preferably, the cooling air guiding member of the power tool may include a plate element that is provided in a cooling air discharge port facing the tool bit from the side of a motor housing that houses the drive motor. Further, openings may be formed through the plate element obliquely toward the work area so as to guide the cooling air toward the work area. Thus, the cooling air can be readily guided toward the work area through the openings formed through the plate element. The plate element may be integrally formed with the cooling air discharge port Alternatively, the plate element may preferably be formed separately and then mounted onto the discharge port. Further, in the latter case, the plate element may be removably mounted on the discharge port.

In view of the efficiency in guiding the cooling air, a plurality of openings may be formed through the plate element obliquely toward the work area.

Preferably, the power tool may further include an illuminating member that illuminates the work area of the workpiece. The cooling air guiding member may be configured also to serve as a retaining member that retains the illuminating member on the body of the power tool. Thus, the cooling air guiding member can provide two different functional elements for guiding the cooling air and for retaining the illuminating member. Therefore, the structure of the power tool can be rationalized. The retaining member can retain part or all of the components on the body which components forms the illuminating member, such as the illuminating element, lead wire to the illuminating element, illumination switch and electric substrate. The term "illuminating the work area" embraces illumination not only on the work spot itself to be worked on with a tool bit, but on a region near the work spot where ink lines are provided on the work piece.

Each of the additional features and method steps disclosed above and below may be utilized separately or in conjunction with other features and method steps to provide improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 2:
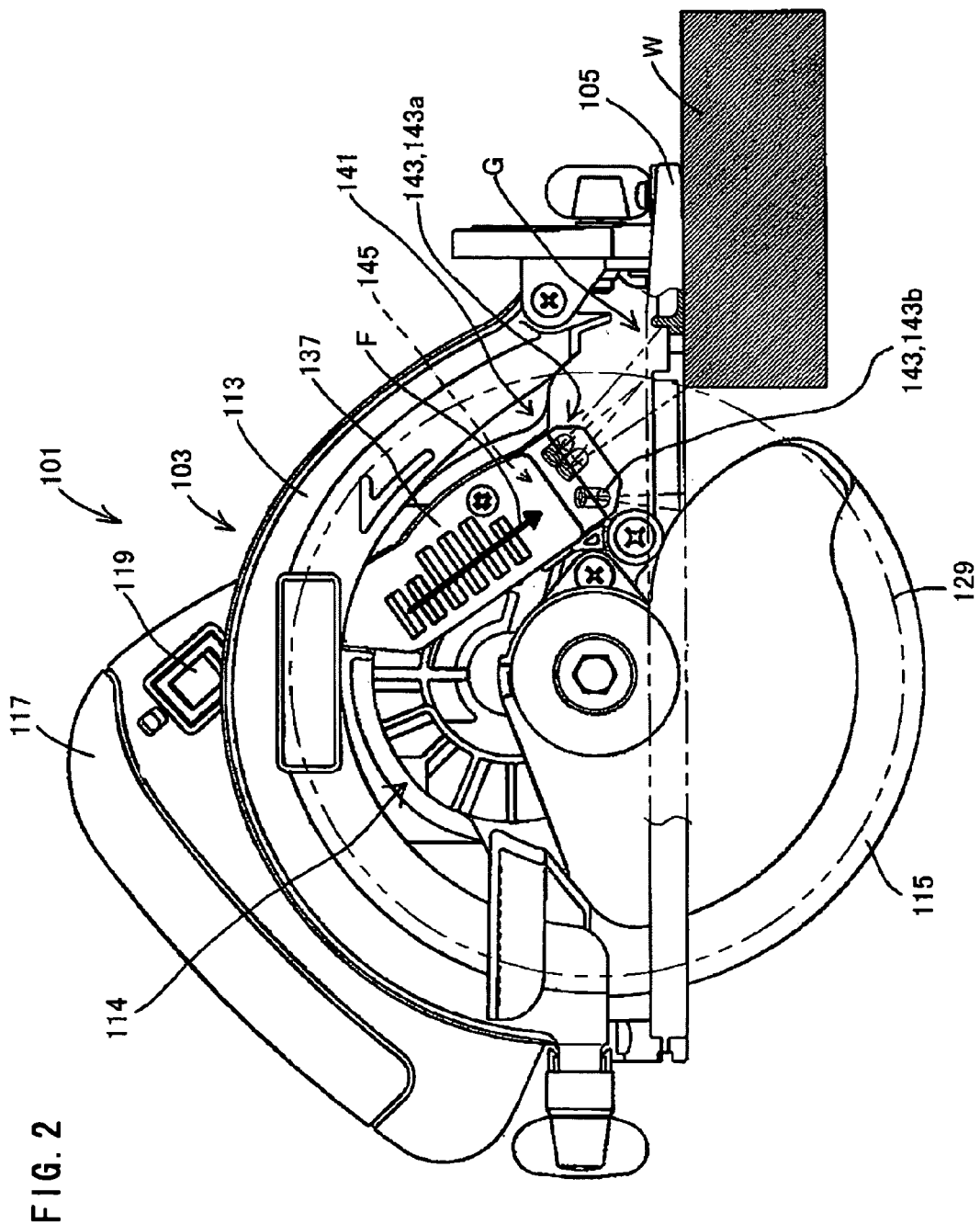
FIG. 2 shows a side view of the circular saw according to the representative embodiment, showing a blade in broken line.

A representative embodiment of the present invention will now be explained in grater detail with respect to a circular saw as an example of power tools. FIGS. 1 and 2 show a circular saw 101 according to the representative embodiment. The circular saw 101 may generally include a body 103 and a base 105 that is connected to the body 103. In use, the base 105 is placed on a workpiece W.

The body 103 may comprise a motor housing 111 and a blade case 113 which are connected to each other. Grip 117 is integrally formed with the motor housing 111. Motor housing 111 houses a drive motor 121 and a cooling fan 131. Cooling fan 131 is fitted around a drive shaft 123 of the drive motor 121. The cooling fan 131 is rotated together with the drive shaft 123 when the drive motor 121 is operated.

Safety cover 115 is retractably attached to the blade case 113 in such a manner that it extends in the lower region of the blade case 113. The blade case 113 houses a blade 129. Further, a gear housing 114 is integrally formed with the blade case 113 and extends toward the side of the motor housing 111. The gear housing 114 houses a gear 125 and a spindle 127 which are arranged in a position corresponding to the shaft end of the drive shaft 123 extending into the gear housing 114.

Blade 129 is attached to the shaft end of the spindle 127 in such a manner that it can rotate together with the spindle 127. The gear 125 is fitted around the other end of the spindle 127 and engages with the shaft end of the drive shaft 123 of the drive motor 121. With this arrangement, the rotational movement of the drive motor 121 is transmitted to the spindle 127 as being suitably decelerated by the gear 125, so that the blade 129 is rotated around the spindle 127 to thereby cut the workpiece W.

A cooling air passage 133 extends from inside the motor housing 111 in the boundary region between the motor housing 111 and the blade case 113 (gear housing 114). One end of the cooling air passage 133 forms a cooling air discharge port 135 that faces the blade 129 disposed in the blade case 113. A plate element 137 is provided within the cooling air discharge port 135. Plate element 137, together with cooling air guiding slits 139 which will be described below corresponds to the feature of "cooling air guiding member" according to the present invention.

Further, as shown in detail in FIG. 2, an illuminating member 141 is provided in the boundary region of the gear housing 114 of the blade case 113. The illuminating member 141 includes an LED 143 and a lead wire 145 for the LED 143. LED 143 comprises an LED 143a that illuminates a cutting work area G of the workpiece W to be cut by the blade 129 and an LED 143b that illuminates a cutting work area H (see FIG. 5) for enabling plunge cut by the circular saw 101 as described below. The plunge cutting will be explained below in detail. Each LED 143 is illuminated as appropriate by operating an illumination switch 119 provided on the grip 117. The lead wire connected to each LED 143 is retained on the gear housing 114 in such a manner that it is hidden behind the plate element 127 as shown in FIG. 2.

Figure 3:
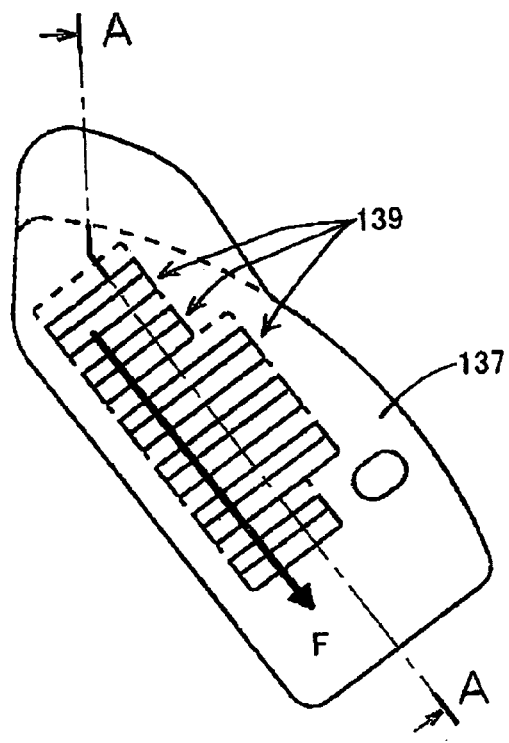
FIG. 3 shows a detailed structure of a plate element utilized within the circular saw according to the representative embodiment.
Figure 4:
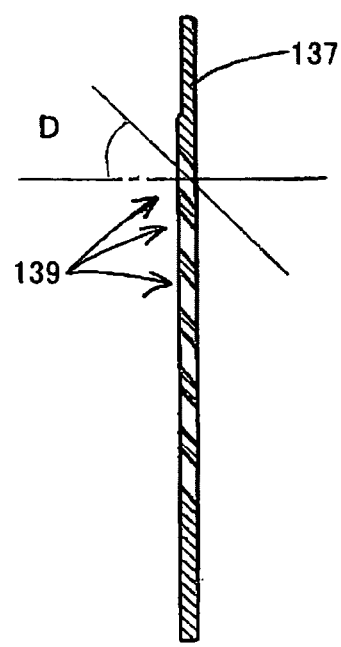
FIG. 4 shows a sectional view of the plate element taken along line A—A in FIG. 3.

FIGS. 3 and 4 show a detailed construction of the plate element 137. FIG. 3 is a front view of the plate element 137 as viewed from the side of the blade case. FIG. 4 is a sectional view taken along line A—A in FIG. 3. As shown in FIGS. 3 and 4, a plurality of cooling air guiding slits 139 are formed in the plate element 137. Each of the cooling air guiding slits 139 is a feature that corresponds to the "opening" according to the present teachings. As shown in FIG. 4, the slit 139 is formed through the plate element 137 at a predetermined inclination angle D with respect to the horizontal plane. The cooling air guiding slits 139 are thus configured and arranged to change the direction of the flow of cooling air, which has been introduced from the direction perpendicular to the surface of the plate element 139, to the guiding direction F (see FIGS. 1 and 2 as well as FIG. 4).

Operation of the circular saw 101 will now be explained. When a trigger switch, which is not particularly shown, is operated, the drive motor 121 is driven and thus the blade 129 is rotated via the drive shaft 123, gear 125 and spindle 127. Thus, as shown in FIG. 2, the cutting operation is performed on the workpiece W with the blade 129 being rotated. In FIG. 2, the portion to be cut with the blade 129 is designated by symbol G as a cutting work area, including ink lines marked on the workpiece W.

As particularly shown in FIG. 1, when the drive motor 121 is driven, the cooling fan 131 that is fitted around the drive shaft 123 rotates together with the drive shaft 123 (see FIG. 1). As the cooling fan 143 rotates, air around the circular saw 101 is led into the motor housing 111 as cooling air and serves to cool the drive motor 121. As the cooling fan 143 further rotates, the cooling air that has been introduced into the motor housing 111 passes through the cooling air passage 133 and the cooling air discharge port 135 and is then discharged toward the blade 129 within the blade case 113.

The cooling air for the drive motor 121 is thus discharged from inside the motor housing 111 toward the blade 129 through the cooling air discharge port 135. At this time, the cooling air is led in the guiding direction F through the cooling air guiding slits 139 (see FIGS. 3 and 4) that are formed obliquely through the plate element 137. Thus, the cooling air is smoothly guided toward the cutting work area G (see FIG. 2) and removes obstacles in the cutting work area G, such as chips. As shown in FIG. 1, the cooling air is guided toward the axis of rotation of the blade 129, or in the direction transverse to the direction in which the workpiece W is cut with the blade 129 (leftward of the blade 129 as viewed in FIG. 1). Otherwise, chips will be blown off in the direction of travel of the circular saw 10, so that ink lines, for example, on the workpiece will possibly be hidden from view under the chips. According to this embodiment, such an event that impairs visibility during cutting operation can be effectively avoided. In the circular saw 101 according to this embodiment, the cooling air that has been used for cooling the drive motor 121 can be effectively used for removing obstacles, such as chips, in the cutting work area G.

Further, in this embodiment, as shown in FIG. 2, the LED 143 that defines the illuminating member 141 is positioned so as to face forward within the passage of the cooling air in the guiding direction F. Therefore, when cooling air is guided via the plate element 137 toward the cutting work area G for the blade 129, chips or other obstacles near the LED 143 (LED 143a and LED 143b) can be blown off. Thus, removal of chips or other obstacles in the cutting work area G and provision of visibility by the illuminating member 141 can be attained at the same time.

Further, the plate element 137 is configured to serve as a supporting plate as well for retaining the lead wire 145 of the illuminating member 141 on the gear housing 114.

Figure 5:
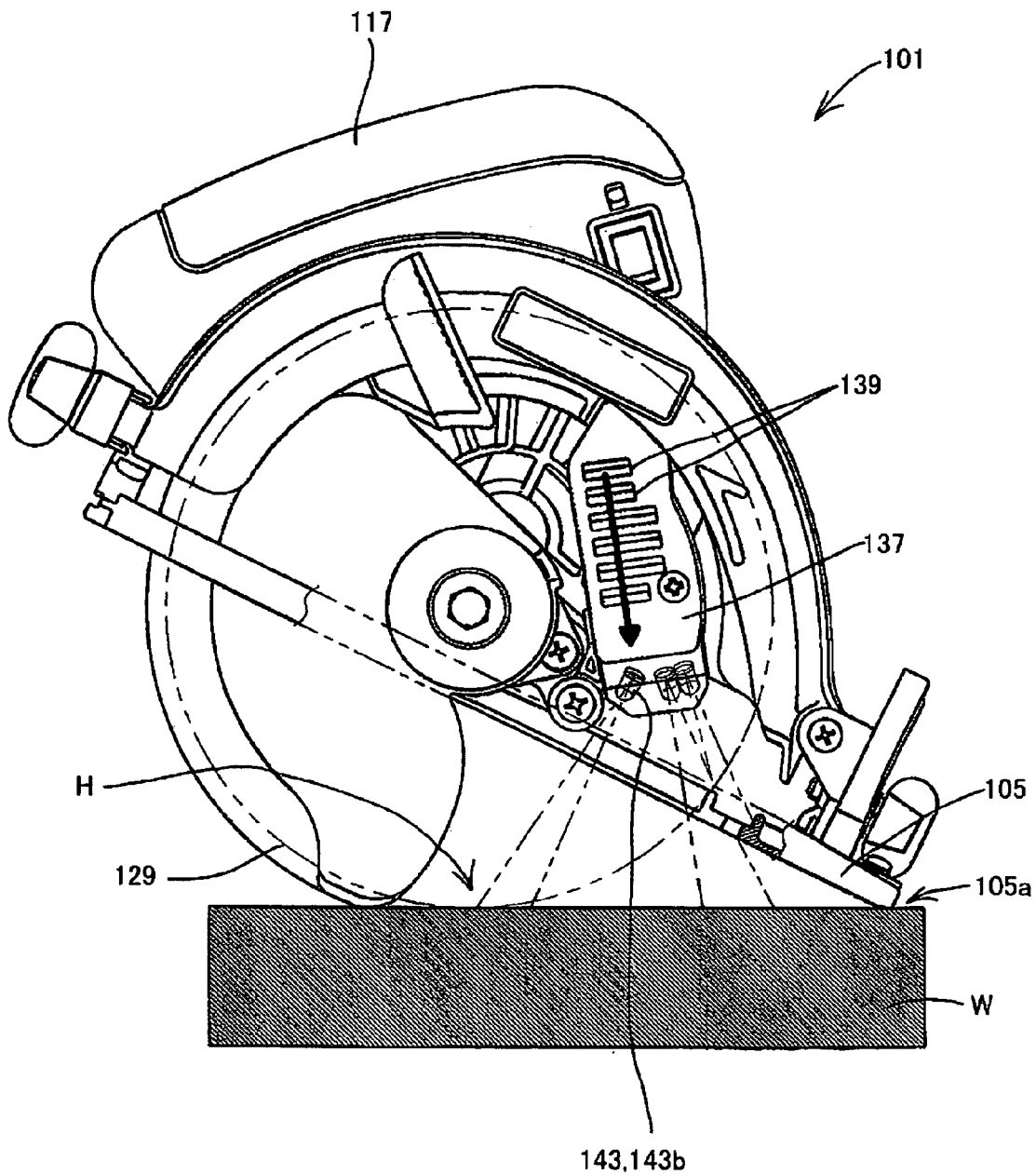
FIG. 5 shows a circular saw according to the representative embodiment, which is held in a position to perform plunge cutting.

In an usual working circumstance, as shown in FIG. 2, cutting operation using the circular saw 101 is generally started from the end region of the workpiece W by the blade 129 of the circular saw 101 which is set on the end region. In accordance with the shape of the workpiece or conditions of cutting operation, however, cutting operation by the blade 129 may not be started from the end region but from the central region of the workpiece as shown in FIG. 5. Such cutting operation is generally referred to as "plunge cutting".

In this embodiment, as shown in FIG. 5, LED 143b within the LEDs 143 of the illuminating member 141 is arranged to illuminate a plunge cutting work area H during plunge cutting operation in which the blade 129 is set on the plunge cutting work area H. Further, the LED 143b is positioned facing forward within the passage in the guiding direction F in which the cooling air is guided via the cooling air guiding slits 139. Therefore, chips or other obstacles can be effectively prevented from being left unremoved near the LED 143b and thus impairing the illuminating capability of the LED 143b. In order to start the cutting operation, in the condition in which the cutting work area is thus clearly illuminated with the LED 143b, operator can easily take a look at the work area and press the circular saw 101 in the direction of the workpiece W by holding the grip 117. Then, the circular saw 101 pivots around the end 105a of the base 105, while the blade 129 cuts the cutting work area H, until the base 104 is brought in surface contact with the workpiece W. Thereafter, usual cutting operation is performed with the blade 129.

DESCRIPTION OF NUMERALS 101 circular saw
103 body
105 base
111 motor housing
113 blade case
114 gear housing
115 safety cover
117 grip
119 illumination switch
121 drive motor
123 drive shaft
125 gear
127 spindle
129 blade
131 cooling fan
133 cooling air passage
135 cooling air discharge port
137 plate element (cooling air guiding member)
139 cooling air guiding slit (opening)
141 illuminating member
143 LED
145 lead wire
F guiding direction of cooling air
G cutting work area
H plunge cutting work area
W work-piece

What is claimed is:

1. A power tool, comprising:
   a tool bit case,
   a tool bit provided within the tool bit case and performs a predetermined operation on a workpiece,
   a drive motor that drives the tool bit, and
   a cooling air guiding member that guides cooling air to cool the drive motor to a work area of the workpiece to be worked on with the tool bit, when the cooling air is discharged into the tool bit case,
   wherein the cooling air guiding member includes a plate element that is provided in a cooling air discharge port, the discharge port facing the tool bit from a side of a motor housing that houses the drive motor, and wherein openings are formed through the plate element toward the work area so as to guide the cooling air toward the work area.

2. The power tool according to claim 1 further comprising an illuminating member that illuminates the work area of the workpiece, wherein the cooling air guiding member also serves as a retaining member that retains the illuminating member on the body of the power tool.

3. The power tool according to claim 1 further comprising an illuminating member that illuminates the work area of the workpiece, wherein the cooling air guiding member leads the cooling air also to the illuminating member.

4. The power tool according to claims 1, wherein the power tool is designed and configured as a circular saw having a blade that is rotated to cut the workpiece and wherein the cooling air guiding member guides the cooling air in a direction transverse to the cutting direction in which the workpiece is cut by the blade.

5. The power tool according to claim 1 further comprising an illuminating member that illuminates the work area of the work piece, wherein the cooling air guiding member also serves as a retaining member that retains the illuminating member on the body of the power tool and the illuminating member is designed and arranged also to illuminate the work are when the power tool is operated to perform a plunge cut.

6. A power tool, comprising:
   a tool bit case,
   a tool bit provided within the tool bit case and performs a predetermined operation on a workpiece,
   a drive motor that drives the tool bit, and means for guiding cooling air to cool the drive motor towards a work area of the workpiece to be worked on with the tool bit, when the cooling air is discharged into the tool bit case, wherein the cooling air guiding means includes a plate element that is provided in a cooling air discharge port, the discharge port facing the tool bit from a side of a motor housing that houses the drive motor, and wherein openings are formed through the plate element toward the work area so as to guide the cooling air toward the work area.

7. The power tool according to claim 6 further comprising means for illuminating the work area of the workpiece, wherein the cooling air guiding means also serves as a retaining member that retains the illuminating means on the body of the power tool.

8. Method of using a power tool that includes a tool bit case, a tool bit provided within the tool bit case and performs a predetermined operation on a workpiece and a drive motor that drives the tool bit comprising:

guiding cooling air to cool the drive motor to a work area of the workpiece to be worked on with the tool bit, when the cooling air is discharged into the tool bit case, wherein the cooling air is guided by utilizing a plate element that is provided in a cooling air discharge port, the discharge port facing the tool bit from a side of a motor housing that houses the drive motor, and wherein openings are formed through the plate element obliquely toward the work area so as to guide the cooling air toward the work area.

9. Method according to claim 8, wherein the power tool further comprising an illuminating member that illuminates the work area of the workpiece and the illuminating member is retained by a member to guide cooling air.

10. A power tool, comprising:

a tool bit case, a tool bit provided within the tool bit case and performs a predetermined operation on a workpiece, a drive motor that drives the tool bit, and a cooling air guiding member that guides cooling air to cool the drive motor towards a work area of the workpiece to be worked on with the tool bit when the cooling air is discharged into the tool bit case, wherein the cooling air guiding member includes a plate element that is provided in a cooling air discharge port, the discharge port facing the tool bit from a side of a motor housing that houses the drive motor, and wherein openings are formed through the plate element obliquely toward the work area so as to guide the cooling air toward the work area.

11. A power tool, comprising:

a tool bit case, a tool bit provided within the tool bit case and performs a predetermined operation on a workpiece, a drive motor that drives the tool bit, a cooling air guiding member that guides cooling air to cool the drive motor towards a work area of the workpiece to be worked on with the tool bit when the cooling air is discharged into the tool bit case, and an illuminating member that illuminates the work area of the workpiece, wherein the cooling air guiding member also serves as a retaining member that retains the illuminating member on the body of the power tools, wherein the cooling air guiding member also serves to retain a lead wire of the illuminating member.

* * * * *